March 29, 1949.  J. NOVAK  2,465,919
ROTARY DIFFERENTIAL HYDRAULIC COUPLING
Filed March 19, 1946  2 Sheets-Sheet 1

INVENTOR.
John Novak
BY
ATTORNEYS.

March 29, 1949. J. NOVAK 2,465,919
ROTARY DIFFERENTIAL HYDRAULIC COUPLING
Filed March 19, 1946 2 Sheets-Sheet 2

John Novak
INVENTOR.

BY
ATTORNEYS.

Patented Mar. 29, 1949

2,465,919

UNITED STATES PATENT OFFICE 2,465,919

ROTARY DIFFERENTIAL HYDRAULIC COUPLING

John Novak, Perth Amboy, N. J., assignor of one-half to Frank Novak, Old Bridge, N. J.

Application March 19, 1946, Serial No. 655,566

2 Claims. (Cl. 60—54)

This invention relates to a differential designed more especially as part of the drive mechanism, it being more especially an improvement upon the structure disclosed in my co-pending application filed February 4, 1946, Ser. No. 645,285.

It is an object of the invention to provide a new and novel arrangement of cooperating rotors utilizing fluid as a means for transmitting motion therebetween.

It is a further object of the invention to provide a structure of this character which is simple and efficient in construction and can be readily taken apart or assembled as found necessary.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
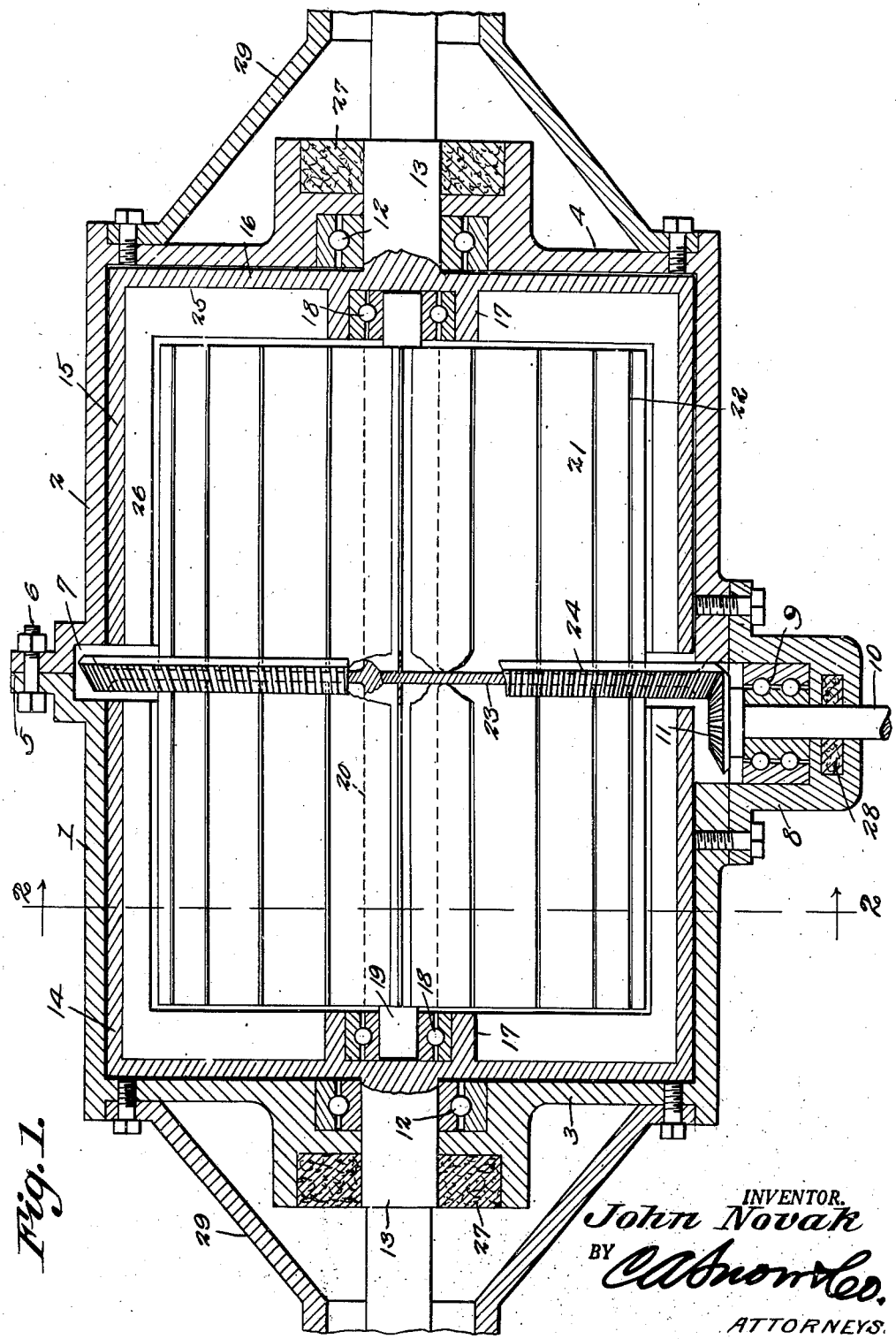
Figure 1 is a vertical longitudinal section through the differential, some of the parts being shown in elevation with portions broken away.
Figure 2:
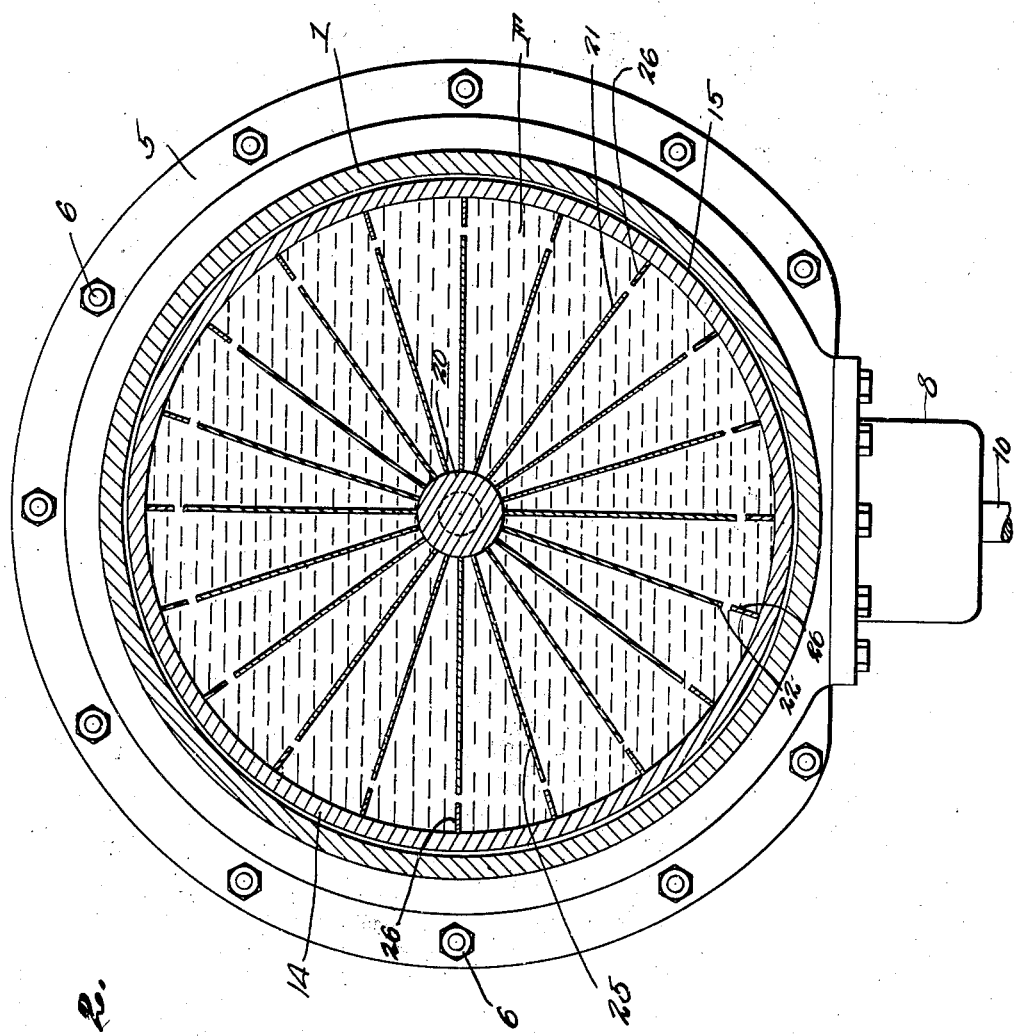
Figure 2 is a section on line 2—2, Figure 1.

Referring to the figures by characters of reference, 1 and 2 designate opposed cylindrical housing sections each of which is closed at one end by a head as indicated at 3 and 4 respectively. The opposite end of each section is provided with an annular flange 5, the flanges of the two sections being held together detachably by any suitable means, such as bolts 6. The inner sides of these flanges are channeled so as to form an annular groove 7 where the two housing sections meet. At one point this groove opens into a small supplemental housing 8 secured to the sections 1 and 2 and provided with a suitable anti-friction bearing 9 in which there is journaled a drive shaft 10. That end of the shaft which projects between the housing members 1 and 2 is provided with a small drive gear 11.

Each of the heads 3 and 4 is provided with an anti-friction bearing 12 and journaled within these bearings are oppositely extending shafts 13 which are aligned and project from the centers of opposed outer rotor sections 14 and 15 respectively. The outer rotor sections are cylindrical and have a working fit within the housing sections 1 and 2 respectively. These ends of the outer rotors adjacent to the heads 3 and 4 are closed as shown at 16, while the opposite ends are open and extend up to the opposed walls of the annular channel 7.

A boss 17 is provided on the inner side of each head or closed end 16 at the center thereof and carries an anti-friction bearing 18. In these anti-friction bearings, which are coaxial with each other and with the shafts 13 are mounted studs 19 extending from the ends of the core 20 of an inner rotor. This inner rotor, which has been indicated generally at 21, has radial blades extending from the core 20 as shown at 22 and these blades also extend up to opposite sides of a central disk 23 forming a part of the inner rotor and provided, at its margin, with a gear 24 which is in constant mesh with the gear 11.

Formed on the inner surface of each of the heads or ends 16 of the outer rotors are radial fins 25 which extend close to the inner rotor and merge, adjacent to the periphery of the outer rotor sections 14 and 15 into parallel fins 26 which extend along the inner surfaces of said rotor sections 14 and 15 and terminate at the inner or open ends thereof. These fins 25 and their outer extensions 26 are supported close to the path of movement of the inner rotor and it is to be understood that in practice all of the space between the rotors and the blades forming parts thereof is filled with a suitable fluid indicated generally at F.

Obviously when the gear 24 is rotated by motion transmitted thereto from shaft 10 by gear 11, the inner rotor 21 will be rotated. This will set up instantly a circulation of the confined fluid which will be deflected outwardly against the parallel fins 26 and also laterally between and against the radial fins 25. Thus these fins 25 and 26 will be caused to rotate with the inner rotor 21 so that motion will therefore be transmitted from the inner rotor through the agitated fluid to the outer rotors 14 and 15 and thence to their respective shafts 13.

It has been found in practice that a structure such as herein described constitutes a very effective means for transmitting motion between rotors so that it becomes especially suitable for use as a differential portion of a drive mechanism.

It is to be understood of course that the various bearings can be suitably sealed with packing generally at 27 and 28 and, if desired, suitable axle housings can be joined to the opposed heads of the housing as indicated at 29.

While this structure is especially adapted for use as a part of the drive mechanism of a motor vehicle, it is to be understood that it could be employed wherever it is desired to utilize a differential in a transmission.

What is claimed is:

1. A differential including a housing comprising opposed housing sections each integrally formed with a cylindrical side wall and a closed outer end, the inner ends being open and having their marginal portions outwardly flanged to constitute means for detachably joining the housing sections, said flanged portions being proportioned, when joined, to define an annular peripheral groove within the housing and intermediate its ends, opposed cylindrical outer rotor sections each mounted for rotation in one of the housing sections, each of said outer rotor sections being closed at its outer end and open at its inner end, the inner ends terminating at the opposed edges of the groove, oppositely extending aligned shafts journaled in the closed ends of the housing and extending from and rotatable with the respective outer rotor sections, radial fins on the inner sides of the closed ends of the rotor sections, parallel fins extending from the radial fins and disposed longitudinally of and within the rotor sections, said parallel fins terminating at the inner ends of said rotor sections, an inner rotor within the outer rotor sections and coaxial therewith and with the shafts, said inner rotor including a core having its ends journaled in the closed ends of the respective outer rotor sections, a disc on the core, a gear on the disc extending into the groove, and radial blades extending from the disc and core and supported close to but out of contact with the radial and longitudinal fins, a fluid filling the housing, and means for driving the gear.

2. A differential including a housing, said housing comprising opposed cylindrical housing sections each having a closed outer end, the inner ends being open and having their marginal portions outwardly flanged to constitute means for detachably joining the housing sections, said flanged portions being proportioned, when joined, to define an annular peripheral groove within the housing and intermediate its ends, opposed aligned shafts journaled in the closed ends of the housing and extending in opposite directions therefrom, opposed outer rotor sections each rotatable in a housing section and operatively connected to the respective shafts for rotation therewith, each of said rotor sections having a closed end and an open end, the open ends being spaced apart and terminating at the opposed edges of the groove, radial fins on the inner sides of the closed ends of the outer rotor sections, parallel fins extending from the radial fins and longitudinally of and within the rotor sections, said parallel fins terminating at the inner ends of said sections, an inner rotor substantially filling the space between the radial fins of the opposed outer rotor sections and the parallel fins of each outer rotor section, said inner rotor being supported close to but out of contact with the radial and parallel fins, the inner rotor including a core having its ends journaled in the closed ends of the respective outer rotor sections, a disc intermediate the ends of the core, a gear on the periphery of the disc extending into the groove, and radial blades extending from the disc and core, a fluid filling the housing, and means for driving the gear.

JOHN NOVAK.

REFERENCES CITED

The following references are of record in the file of this patent:

UNITED STATES PATENTS

| Number | Name | Date |
|---|---|---|
| 1,613,154 | Bauer et al. | Jan. 4, 1927 |
| 2,287,498 | Scofield | June 23, 1942 |